United States Patent Office 3,644,320
Patented Feb. 22, 1972

3,644,320
PROCESS FOR PRODUCING HIGHLY CRYSTALLINE POLYOLEFINS
Shotaro Sugiura, Haruo Ueno, Hideo Ishikawa, and Takefumi Yano, Ube-shi, and Tuneo Shimamura, Onoda-shi, Japan, assignors to Ube Industries, Ltd., Ube-shi, Japan
No Drawing. Filed Dec. 9, 1968, Ser. No. 782,423
Int. Cl. C08f 1/56, 3/10
U.S. Cl. 260—93.7
7 Claims

ABSTRACT OF THE DISCLOSURE

A process for producing solid, highly crystalline polyolefins which comprises polymerizing the alpha-olefins with a three-component catalyst system obtained by mixing together an organoaluminum compound, a titanium trihalide and either a trithiophosphite or trithiophosphate.

---

This invention relates to a process for producing highly crystalline polyolefins from alpha-olefins by using a new catalyst system.

More specifically, the present invention relates to a process for producing solid, highly crystalline polyolefins which comprises polymerizing the alpha-olefins with a three-component catalyst system obtained by mixing together an organoaluminum compound, a titanium trihalide and either a trithiophosphite or trithiophosphate.

It is known that crystalline polyolefins can be obtained by polymerizing the alpha-olefins in the presence or absence of an inert organic solvent using a catalyst system obtained from the organic compounds of the metals of Groups I–III and the halides of the transition metals of Groups IV–VI of the Periodic Table of elements. For example, in polymerizing propylene, the boiling heptane-insoluble polymer produced is 75–85% of the total polymer formed when a catalyst obtained from triethylaluminum and titanium trichloride is used, while 80–90% is produced when a catalyst obtained from diethylaluminum monochloride and titanium trichloride is used. Thus, there still is contained 10–25% of amorphous polymer in the crystalline polymer. The crystalline polymer containing a considerable amount of amorphous polymer, when used in its as-obtained state as film, fiber or after processing into other articles is not desirable from the standpoint of the properties of the article. Hence, it is necessary to extract and remove the amorphous polymer from the polymeric mixture so far as feasible using an organic solvent such as acetone, ether and heptane. In consequence, the loss due to the formation of the useless amorphous polymer and the increase in costs resulting from the necessity of extracting the amorphous polymer cannot be avoided.

We found that when a mixture obtained by adding to the titanium trihalide an organoaluminum compound, a specific phosphorus compound, i.e. a trithiophosphite and/or trithiophosphate, is used as catalyst in the polymerization of propylene, the content of the amorphous polymer in the resulting polypropylene could be reduced to a marked degree, for example, the content of the boiling heptane-insoluble polymer could be raised to more than about 95%.

Accordingly, the object of the present invention is to provide a process for producing polyolefins wherein the resulting polyolefins, for example, polypropylene, can be used directly in obtaining the final shaped articles such as fiber, film, etc., without the necessity for the step of extracting the amorphous polymer with an organic solvent. The foregoing object is achieved by using in accordance with the invention process a catalyst obtained by mixing together an organoaluminum compound, a titanium trihalide, and a trithiophosphite and/or trithiophosphate. Thus, the content of the amorphous polymer in the crystalline poly(alpha-olefins) produced by the process of this invention is small. For example, the polypropylene obtained by polymerizing propylene in accordance with the invention process using diethylaluminum monochloride as the organoaluminum compound contains above about 95% of boiling heptane-insoluble polymer. Hence, the present invention is advantageous in the amorphous polymer extraction step, which has been customarily practiced heretofore, can be omitted, since the polypropylene obtained can be processed as-obtained, making it possible to put the product immediately to practical use without this extra step.

As the organoaluminum compound, one of the components of the catalyst used in the invention process, used are the compounds of the formula $$AlR_nX_{3-n}$$

wherein R is an alkyl group of not more than 8 carbon atoms, preferably methyl, ethyl, propyl and butyl, X is halogen, chlorine being especially preferred, and $n$ is either 3 or 2; particularly preferred being triethylaluminum and diethylaluminum monochloride. In polymerizing propylene, dialkylaluminum monohalide is conveniently used, whereas in polymerizing butene-1, trialkylaluminum is preferred.

As the titanium trihalide, one of the other components of the catalyst, the chloride, iodide and bromide of trivalent titanium are preferred, and especially preferred is titanium trichloride. Further, as these titanium trihalides, those which contain in part other constituents, for example, the titanium trichloride obtained by reducing titanium tetrachloride with aluminum an dcontaining aluminum chloride in a mole ratio of about 3:1 or that obtained by reducing titanium tetrachloride with an organoaluminum compound can also be effectively used. Again, these halides which have been activated by means of a ball-milling treatment also give good results.

The trithiophosphite and trithiophosphate, the other component of the catalyst, are compounds represented respectively by the formulas $(R'S)_3P$ and $(R'S)_3PO$, wherein R' being a hydrocarbon group of not more than 20 carbon atoms is preferably an alkyl group of not more than 20 carbon atoms such as methyl, ethyl, propyl, butyl, decyl and lauryl; an aryl group of 6–12 carbon atoms such as phenyl, tolyl, xylyl, napthyl, and methylnaphthyl; and an aralkyl group of 7–20 carbon atoms such as benzyl, methylbenzyl, phenethyl, phenylnonyl and phenyldodecyl. It goes without saying that each of R's in these trithiophosphites and trithiophosphates can either be the same or different. Particularly preferred trithiophosphites or trithiophosphates include triethyltrithiophosphate, tributyltrithiophosphite, trilauryltrithiophosphite, triphenyltrithiophosphite, tribenzyltrithiophosphite, triethyltrithiophosphate, trilauryltrithiophosphate, tribenzyltrithiophosphate and triphenyltrithiophosphate.

It is particularly important that the trithiophosphite or trithiophosphate be used as the third component of the catalyst in the present invention. To be sure, it is known to use either an organic phosphite or an organic phosphate as the third component of a polymerization catalyst of alpha-olefins, but the use of these third components usually resulted in an excessive decline of the polymerization activity of the catalyst and also an improvement in the content of the boiling heptane-insoluble polymer could not be expected. However, it was a surprise to find that when the aforementioned trithiophosphites and trithiophosphates were used, unlike the conventional polymerization catalysts of alpha-olefins, the content of the boiling heptane-insoluble polymer could be raised to a high level.

Moreover, in the conventional alpha-olefin polymerization catalysts which use either the organic phosphites or organic phosphates as the third component, there was noted a great decline in polymerization activity, whereas the decline of polymerization activity in the case of the catalyst according to the present invention was not so great. Furthermore, as compared with the catalysts which were prepared without the addition of trithiophosphite or trithiophosphate, a pronounced increase in the polymerization activity was had by a suitable choice of the preparation conditions of the catalyst. This was an entirely unexpected new finding in view of the fact that it is commonly known that in the case of the conventional catalyst for use in the production of highly crystalline polyolefins, which is obtained by adding a third component to an organoaluminum compound and a titanium halide, there is generally a decrease in the polymerization activity upon addition of the third component to result in an inhibition of the polymerization reaction.

The catalyst used in the invention process is obtained by admixing the aforesaid titanium trihalide, organoaluminum compound and trithiophosphite or trithiophosphate, the mole ratio of said titanium trihalide to organoaluminum compound (Ti/Al) being 0.1–10 and that of the trithiophosphite or trithiophosphate to the organoaluminum compound (P/Al) being 0.005–5, preferably 0.05–1.

In this case it is possible to admix the three components of the catalyst at the same time in the foregoing proportions and use the so obtained mixture directly in the polymerization of the alpha-olefins. However, it is preferred according to the invention process that the catalyst used is one obtained by admixing the organoaluminum compound first with the trithiophosphite or trithiophosphate in an inert organic solvent, for example, a polymerization solvent as hereinafter indicated, then ageing the mixture at 0–80° C., and preferably 10–50° C., for at least one hour, and preferably 5–30 hours, and thereafter admixing the titanium trihalide in this system. The catalyst prepared by this method has a very high polymerization activity and is characterized in that its polymerization activity is greatly increased over that of the catalyst in which the trithiophosphite or trithiophosphate has not been incorporated, as well as that it provides polyolefins of exceedingly high crystallinity and stereoregularity, i.e. polyolefins whose boiling heptane-soluble polymer is very small.

The alpha-olefins which can be used in the invention process include the alpha-monoolefins of the formula

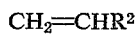

wherein $R^2$ is an alkyl group of 1–4 carbon atoms, mixtures of said olefins, or mixtures of said olefins and ethylene in an amount that will provide in the resulting polyolefins no more than up to 10 mol percent of polymerized ethylene. As the foregoing monoolefins, included are propylene, butene-1 and 4-methylpentene-1. According to the invention process, these alpha-olefins can be homopolymerized or they can be random- or block-copolymerized. When the alpha-olefins are to be random-copolymerized, it is necessary that the amount of the comonomer be held to below about 10 mol percent for ensuring that the resulting copolymers are crystalline. Further, it is possible in the present invention to use ethylene as a comonomer, provided that it is used in a range that does not substantially decrease the crystallinity of the resulting polymer. In this case, the amount of ethylene used must be one which will provide no more than up to 10 mol percent of polymerized ethylene in the resulting polyolefin.

In practicing the process of this invention, other additives such, for example, as hydrogen, can also be incorporated for adjusting the molecular weight of the resulting polyolefins.

In carrying out the invention process, the hereinbefore described catalyst is dispersed either in an inert solvent (e.g. an aliphatic hydrocarbon such as hexane, heptane, butane and propane or an aromatic hydrocarbon such as benzene and toluene or the halogenated derivatives thereof such as chlorobenzene) or in the liquid alpha-olefin to be used as the monomer, and the polymerization of the alpha-olefins is carried out in this system in an atmosphere of an inert gas, avoiding contact with air. The alpha-olefins can be introduced into the reaction system either in a liquid or gaseous form.

Again, the polymerization can also be carried out with only the saturated aliphatic hydrocarbon that is entrained with the alpha-olefins, for example, propane that is contained in propylene, i.e., without the use of any other inert solvent.

A polymerization temperature of 0–150° C., and particularly 20–80° C., and a polymerization pressure of normal atmospheric pressure to 100 atmospheres are conveniently employed.

The following examples are given for illustrating the process of the present invention. The proportion contained of the highly crystalline polymer in the resulting polymer in the examples given was indicated in the following manner. In the case of polypropylene the resulting polymer was extracted for 25 hours with boiling heptane, and in the case of polybutene-1 the extraction was carried out for 25 hours with boiling ether, the proportion of the highly crystalline polymer in the resulting polymer being indicated by the amount of extraction residue. On the other hand, the inherent viscosity was measured in tetralin in a 135° C. constant temperature tank.

EXAMPLE 1

After purging the air inside a stainless steel agitating type 500-ml. autoclave thoroughly with nitrogen gas, the autoclave was charged with 300 ml. of n-heptane, 0.50 gram of AA type titanium trichloride ($3TiCl_3 \cdot AlCl_3$), 0.90 gram of diethylaluminum chloride and 0.2 millimole of trilauryltrithiophosphite. Propylene was polymerized by continuously introducing it into the autoclave while maintaining a polymerization temperature of 60° C. and a pressure of 2 kg./cm.$^2$ gauge. Two hours after introduction of the propylene was started, the autoclave was opened and the catalyst was decomposed by adding a 5% solution of hydrochloric acid in methanol. The resulting polypropylene was withdrawn, washed thoroughly with a 50:50 methanol-isopropanol mixture, and thereafter dried in vacuum.

15.4 grams of polypropylene were obtained whose boiling heptane-insoluble portion was 95.3% and inherent viscosity was 2.2.

EXAMPLES 2–8 AND CONTROLS 1 and 2

Example 1 was repeated except that the trithiophosphites and trithiophosphates indicated in Table I, below, were used in the amounts indicated therein and the organoaluminum compounds indicated therein were used. The results obtained are shown in Table I.

As controls, experiments were conducted using the same catalyst but without the addition of the trithiophosphite or trithiophosphate. The results obtained in these instances are also shown in Table I.

It is apparent from the results given in Table I that the boiling heptane-insoluble portion of the resulting polypropylene can be improved to a marked degree by the addition of either trithiophosphite or trithiophosphate.

EXAMPLES 9–11 AND CONTROLS 3 AND 4

The inside of the apparatus described in Example 1 was thoroughly purged with nitrogen gas, after which it was charged with a mixture obtained by admixing 5 ml. of n-heptane with the catalyst components indicated in Table II. On charging the apparatus with 84 grams of liquid propylene, it was closed, and the polymerization reaction was carried out under the conditions indicated in Table II, followed by treating the reaction product as in Example 1 to obtain polypropylene. The results obtained are shown in Table II.

Polypropylene whose content of boiling heptane-insoluble portion was high was obtained at a higher yield by the addition of the trithiophosphates or trithiophosphites than when these were not added.

5) was obtained in an amount of 33.3 grams. The boiling ether-insoluble portion in this case was 55.6% and the inherent viscosity was 0.95.

EXAMPLES 13–27 AND CONTROLS 6 AND 7

The organoaluminum compound and trithiophosphite or trithiophosphate indicated in Table III, below, were added to a nitrogen-purged 500-ml. autoclave containing

TABLE I

| | Catalyst | | | | | | Polymer | | |
|---|---|---|---|---|---|---|---|---|---|
| | Titanium halide | | Organoaluminum | | Third component | | Boiling heptane insoluble portion, percent | Inherent viscosity ($\eta$) | Yield, g. |
| No. | Class (AA type) | Amount, g. | Class | Amount, g. | Class | Amount, mmol | | | |
| Example 1 | 3TiCl$_3$·AlCl$_3$ | 0.50 | Al(C$_2$H$_5$)$_2$Cl | 0.9 | Trilauryltrithiophosphite | 0.2 | 95.3 | 2.2 | 15.4 |
| Example 2 | Same | 0.50 | Same | 0.9 | do | 0.8 | 95.9 | 4.7 | 17.5 |
| Example 3 | do | 0.50 | do | 0.9 | do | 1.2 | 96.2 | 3.4 | 20.7 |
| Example 4 | do | 0.50 | do | 0.9 | do | 3.2 | 95.6 | 3.6 | 16.5 |
| Example 5 | do | 0.50 | do | 0.9 | Triethyltrithiophosphite | 0.1 | 95.3 | 3.2 | 14.2 |
| Example 6 | do | 0.50 | do | 0.9 | Triphenyltrithiophosphite | 0.2 | 97.6 | 3.0 | 7.6 |
| Example 7 | do | 0.50 | do | 0.9 | Triphenyltrithiophosphate | 0.4 | 96.8 | 3.4 | 13.3 |
| Control 1 | do | 0.50 | do | 0.9 | Not added | 0 | 89.3 | 2.9 | 19.8 |
| Example 8 | do | 0.50 | Al(C$_2$H$_5$)$_3$ | 0.9 | Trilauryltrithiophosphite | 1.4 | 88.8 | 3.0 | 22.4 |
| Control 2 | do | 0.50 | Same | 0.9 | Not added | 0 | 82.3 | 2.8 | 22.3 |

TABLE II

| | Catalyst | | | | | | Polymerization conditions | | Polymer | | |
|---|---|---|---|---|---|---|---|---|---|---|---|
| | Titanium halide | | Organoaluminum | | Third component | | | | Boiling heptane insoluble portion, percent | Inherent viscosity ($\eta$) | Yield, g. |
| No. | Class (AA type) | Amt., g. | Class | Amt., g. | Class | Amt., mmol | Temp. (°C.) | Time, hr. | | | |
| Example 9 | 3TiCl$_3$·AlCl$_3$ | 0.2 | Al(C$_2$H$_5$)$_2$Cl | 0.36 | Trilauryltrithiophosphite | 0.16 | 60 | 2 | 95.2 | 3.5 | 76.1 |
| Example 10 | Same | 0.2 | Same | 0.36 | do | 0.16 | 40 | 2 | 96.4 | 3.4 | 59.6 |
| Example 11 | do | 0.2 | do | 0.36 | Triphenyltrithiophosphate | 0.16 | 60 | 2 | 95.3 | 3.4 | 71.6 |
| Control 3 | do | 0.2 | do | 0.36 | Not added | 0 | 60 | 2 | 90.2 | 3.2 | 66.7 |
| Control 4 | do | 0.2 | do | 0.36 | do | 0 | 40 | 2 | 92.0 | 3.6 | 48.8 |

EXAMPLE 12 AND CONTROL 5

As in Example 1, 38 grams of butene-1 were polymerized in 320 ml. of n-heptane at 60° C. for 4 hours using as catalyst 0.50 gram of AA type titanium trichloride, 1.14 grams of triethylaluminum and 1.0 millimole of trilauryltrithiophosphite. The polymerization reaction product was treated as in Example 1, and 37.1 grams of polybutene-1 of boiling ether-insoluble portion of 72.4% and inherent viscosity of 1.15 were obtained.

The polybutene-1 obtained under identical conditions but without the addition of the trithiophosphite (Control 5) was obtained in an amount of 33.3 grams. The boiling ether-insoluble portion in this case was 55.6% and the inherent viscosity was 0.95.

20 ml. of n-heptane and mixed therewith. After allowing this mixture to age at 25–30° C. for 20 hours, the titanium chloride indicated in Table III and 280 ml. of n-heptane were added, after which propylene or butene-1 was introduced as in Example 1 or 12 to carry out the polymerization reaction, followed by treating the reaction product as in Example 1.

As controls, experiments were conducted on catalysts which excepting that trithiophosphite or trithiophosphate was not used were the same.

The results obtained are shown in Table III.

TABLE III(a)

| | | Catalyst | | | | | |
|---|---|---|---|---|---|---|---|
| | | Third component | | Organoaluminum | | Titanium halide | |
| No. | Monomer | Class | Amount, Mmol | Class | Amount, g. | Class | Amount, g. |
| Example 13 | Propylene | Tributyltrithiophosphite | 1.4 | Al(C$_2$H$_5$)$_2$Cl | 0.9 | 3TiCl$_3$·AlCl$_3$ | 0.5 |
| Example 14 | do | Trilauryltrithiophosphite | 1.4 | Same | 0.9 | Same | 0.5 |
| Example 15 | do | Triphenyltrithiophosphite | 1.4 | do | 0.9 | do | 0.5 |
| Example 16 | do | Tribenzyltrithiophosphite | 1.4 | do | 0.9 | do | 0.5 |
| Example 17 | do | Triethyltrithiophosphate | 1.4 | do | 0.9 | do | 0.5 |
| Example 18 | do | Trilauryltrithiophosphate | 1.4 | do | 0.9 | do | 0.5 |
| Example 19 | do | Triphenyltrithiophosphate | 1.4 | do | 0.9 | do | 0.5 |
| Example 20 | do | Tribenzyltrithiophosphate | 1.4 | do | 0.9 | do | 0.5 |
| Example 21 | do | Trilauryltrithiophosphite | 1.4 | do | 0.9 | TiCl$_3$ | 0.5 |
| Example 22 | do | Triphenyltrithiophosphate | 1.4 | do | 0.9 | Same | 0.5 |
| Control 6 | do | Not added | 0 | do | 0.9 | do | 0.5 |
| Example 23 | do | Trilauryltrithiophosphite | 1.4 | Al(C$_2$H$_5$)$_3$ | 0.9 | 3TiCl$_3$·AlCl$_3$ | 0.5 |
| Example 24 | do | Trilauryltrithiophosphate | 1.4 | Same | 0.9 | Same | 0.5 |
| Control 7 | do | Not added | 0 | do | 0.9 | do | 0.5 |
| Example 25 | Butene-1,38 g. | Trilauryltrithiophosphite | 1.4 | Al(C$_2$H$_5$)$_2$Cl | 0.9 | do | 0.5 |
| Example 26 | do | Triphenyltrithiophosphate | 1.4 | Same | 0.9 | do | 0.5 |
| Example 27 | do | Trilauryltrithiophosphite | 1.4 | Al(C$_2$H$_5$)$_3$ | 0.9 | do | 0.5 |

TABLE III(b)

| No. | Polymerization conditions ||| Polymer |||
|---|---|---|---|---|---|---|
| | Temp. (° C.) | Pressure, kg./cm.² gauge | Time (hr.) | Boiling heptane insoluble portion, percent | Inherent viscosity (η) | Yield, g. |
| Example 13 | 60 | 2 | 2 | 95.5 | 3.4 | 23.4 |
| Example 14 | 60 | 2 | 2 | 97.5 | 3.5 | 37.0 |
| Example 15 | 60 | 2 | 2 | 96.9 | 3.7 | 31.5 |
| Example 16 | 60 | 2 | 2 | 97.1 | 3.6 | 28.7 |
| Example 17 | 60 | 2 | 2 | 97.5 | 3.9 | 24.6 |
| Example 18 | 60 | 2 | 2 | 96.2 | 3.7 | 32.4 |
| Example 19 | 60 | 2 | 2 | 96.8 | 3.4 | 28.1 |
| Example 20 | 60 | 2 | 2 | 97.4 | 3.4 | 27.3 |
| Example 21 | 60 | 2 | 2 | 94.1 | 3.2 | 18.0 |
| Example 22 | 60 | 2 | 2 | 93.9 | 3.5 | 19.3 |
| Control 6 | 60 | 2 | 2 | 88.4 | 3.2 | 15.3 |
| Example 23 | 60 | 2 | 2 | 88.3 | 2.9 | 36.3 |
| Example 24 | 60 | 2 | 2 | 87.6 | 2.8 | 30.0 |
| Control 7 | 60 | 2 | 2 | 82.3 | 2.8 | 22.3 |
| Example 25 | 60 | | 4 | *73.1 | 1.2 | 37.2 |
| Example 26 | 60 | | 4 | *72.1 | 1.1 | 31.1 |
| Example 27 | 60 | | 4 | *69.9 | 1.0 | 36.4 |

*Boiling ether-insoluble portion, percent.

EXAMPLE 28

After the inside of an autoclave such as described in Example 1 was purged with nitrogen gas, 5 ml., of n-heptane were charged thereto, followed by the admixture therewith of 0.16 millimole of trilauryltrithiophosphite and 0.36 gram of Al(C₂H₅)₂Cl. After this mixture was allowed to age at 25–30° C. for 20 hours, 0.2 gram of 3 TiCl₃·AlCl₃ was added, followed by the addition of 84 grams of liquid propylene. The autoclave was then closed and the polymerization reaction was carried out at 40° C. for 2 hours. The resulting reaction product was then given the after-treatments as in Example 1, and 75.2 grams of polypropylene whose boiling heptane-insoluble portion was 96.1% and inherent viscosity [η] was 3.9 were obtained.

CONTROLS 8–11

Propylene was polymerized as in Example 1, except that instead of trilauryltrithiophosphite the phosphite or phosphate indicated in Table IV was used in the amount indicated therein. The results obtained are shown in Table IV.

It is apparent from the results given in Table IV that none of the phosphites or phosphates not containing a sulfur atom could improve the boiling heptane-insoluble portion of the resulting polypropylene.

TABLE IV

| Control No. | Third component of catalyst || Polymer |||
|---|---|---|---|---|---|
| | Class | Amt. mmol | Boiling heptane insoluble portion, percent | Inherent viscosity (η) | Yield, g. |
| 8 | Triethylphosphite | 0.1 | 90.0 | 3.0 | 16.5 |
| 9 | Triethylphosphate | 0.1 | 80.0 | 2.8 | 11.5 |
| 10 | Triphenylphosphite | 0.4 | 86.8 | 3.1 | 10.9 |
| 11 | Triphenylphosphate | 0.4 | 90.1 | 3.1 | 15.7 |

We claim:
1. A process for producing solid crystalline polyolefins which comprises polymerizing an olefin of the formula

$$CH_2=CHR^2$$

wherein R² is an alkyl group of 1–4 carbon atoms, mixtures of said olefins, or mixtures of said olefins and ethylene in an amount that will provide in the resulting polyolefin not more than 10 mol percent of polymerized ethylene, the polymerization reaction being carried out in the presence of a catalytic amount of a three-component catalyst system obtained by mixing
(a) a titanium trihalide,
(b) an organoaluminum compound of the formula $$AlR_nX_{3-n}$$

wherein R is an alkyl group of 1–8 carbon atoms, X is halogen and n is an integer 2 to 3, and (c) a phosphorus compound selected from the group consisting of trithiophosphites of the formula $$(R'S)_3P$$

wherein R' is a hydrogen group of 1–20 carbon atoms, and trithiophosphates of the formula $$(R'S)_3P=O$$

wherein R' is as defined above, the mol ratio of said organoaluminum compound to said titanium trihalide being between 1:0.1 and 1:10 and the mol ratio of said organoaluminum compound to said phosphorus compound being between 1:0.005 and 1:5.

2. The process of claim 1 wherein said titanium trihalide is selected from the group consisting of titanium trichloride and 3TiCl₃·AlCl₃.

3. The process according to claim 1 wherein said organoaluminum compound is selected from the group consisting of triethylaluminum and diethylaluminum monochloride.

4. The process according to claim 1 in which said phosphorus compound is selected from the group consisting of trithiophosphites of the formula $$(R'S)_3P$$

and trithiophosphates of the formula $$(R'S)_3P=O$$

wherein R' is a hydrocarbon group selected from the class consisting of alkyl group of 1–20 carbon atoms, aryl groups of 6–12 carbon atoms and aralkyl groups of 7–20 carbon atoms.

5. The process of claim 1 wherein said alpha-olefin is a member selected from the group consisting of propylene and butene-1.

6. The process of claim 1 wherein said polymerization reaction is carried out at a temperature of 0–150° C.

7. The process of claim 1 wherein said catalyst is a mixture obtained by admixing
(a) a titanium trihalide with an admixture obtained by admixing in an inert organic solvent
(b) an organoaluminum compound of the formula $$AlR_nX_{3-n}$$

wherein R is an alkyl group of 1–8 carbon atoms, X is halogen and n is an integer 2 to 3, with
(c) a phosphorus compound selected from the group consisting of trithiophosphites of the formula $$(R'S)_3P$$

and trithiophosphates of the formula $$(R'S)_3P=O$$

wherein R' is a hydrocarbon group of 1–20 carbon atoms, said admixture being aged at 0–80° C. for at least one hour before being admixed with said titanium trihalide.

References Cited

UNITED STATES PATENTS 3,264,277  8/1966  Winkler et al. _____ 260—93.7
3,502,634  3/1970  Stedefeder et al. ____ 260—93.7

OTHER REFERENCES 1,006,919  10/1965  Great Britain.
1,231,089  9/1960  France.

JOSEPH L. SCHOFER, Primary Examiner

E. J. SMITH, Assistant Examiner

U.S. Cl. X.R.

252—429; 260—88.2 B, 919 C, CB